United States Patent [19]
Gutai

[11] 3,885,211
[45] May 20, 1975

[54] RECHARGEABLE BATTERY-OPERATED ILLUMINATING DEVICE

[75] Inventor: Jeno B. Gutai, Thousand Oaks, Calif.

[73] Assignee: Statham Instruments, Inc., Oxnard, Calif.

[22] Filed: Sept. 16, 1974

[21] Appl. No.: 506,104

[52] U.S. Cl. .............. 320/2; 200/60; 240/10.6 CH; 338/200
[51] Int. Cl. .................. F21l 7/00; H02m 45/04
[58] Field of Search .............. 320/2; 200/60, 61.46; 240/10.6, 10.6 CH; 338/200, 215; 336/115, 118

[56] References Cited
UNITED STATES PATENTS

| | | | |
|---|---|---|---|
| 1,999,079 | 4/1935 | Blake | 200/60 UX |
| 3,277,358 | 10/1966 | Nicholl | 320/2 X |
| 3,418,552 | 12/1968 | Holmes | 320/2 |
| 3,800,136 | 3/1974 | Edelson | 240/10.6 R |

*Primary Examiner*—J. D. Miller
*Assistant Examiner*—Robert J. Hickey

[57] ABSTRACT

This invention relates to a rechargeable battery device including an inductively coupled power source.

7 Claims, 7 Drawing Figures

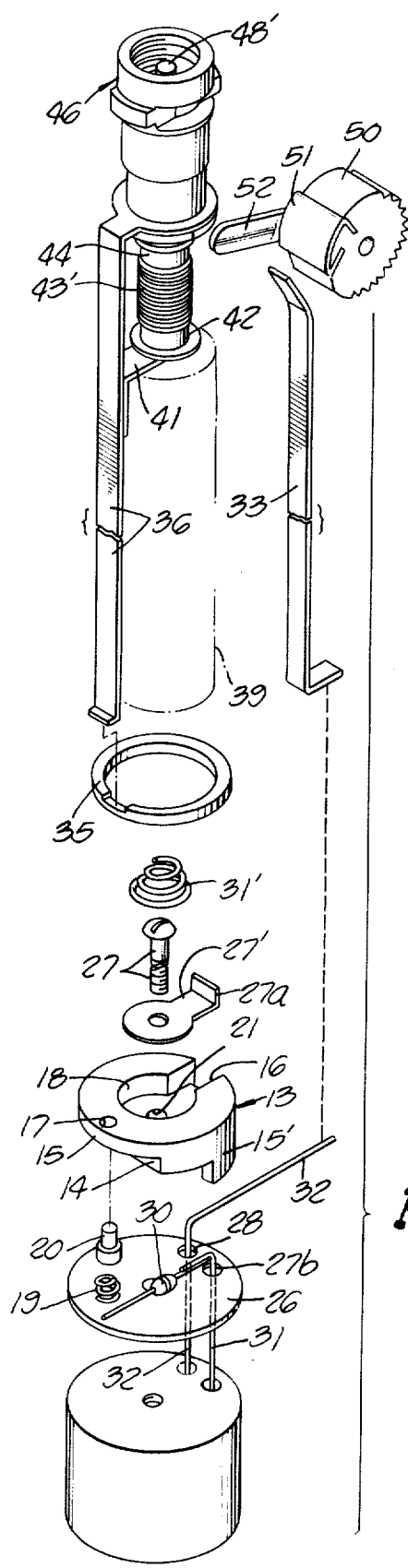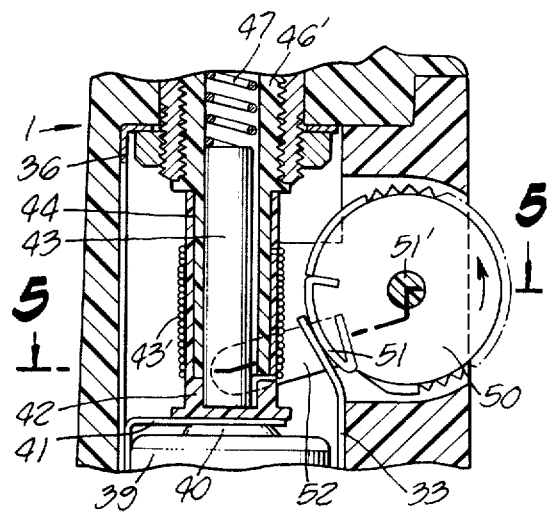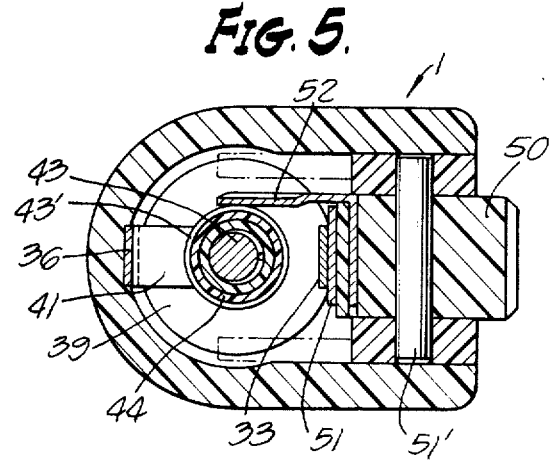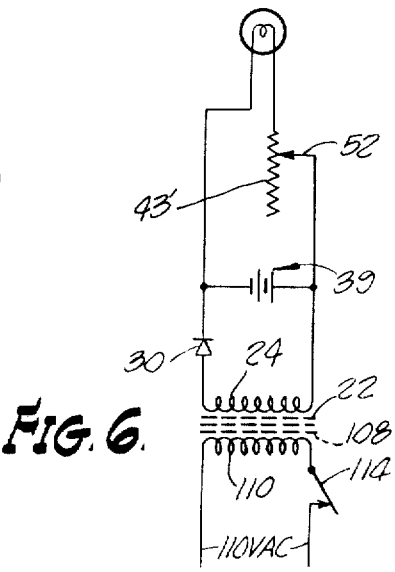
FIG. 3.
FIG. 4.
FIG. 5.
FIG. 6.

RECHARGEABLE BATTERY-OPERATED ILLUMINATING DEVICE

This invention relates to a rechargeable batteryoperated light source which is suitable if desired to be installed in a portable hand-operated illumination device, such as a diagnostic medical device.

The object of this invention is to provide a simple and effective device for conducting electrical power to a rechargeable battery and to eliminate any risks of bad contacts as a result of oxidation or contamination or the introduction of any foreign objects or materials.

It is a further object of my invention to employ an inductive charging device which is suitable for the recharging of a battery-operated hand-held illuminating or other electrically operated device.

This invention will be further described in connection with the drawings of which FIG. 1 showed one form of the rechargeable battery illuminating device with the rechargeable battery held in position for recharging;

FIG. 3 is an exploded view of FIG. 2;

FIG. 4 is a partial view of FIG. 2;

FIG. 5 is a section taken on line 5—5 of FIG. 4;

FIG. 6 is a schematic wiring diagram of the unit FIG. 2;

Figure 2:
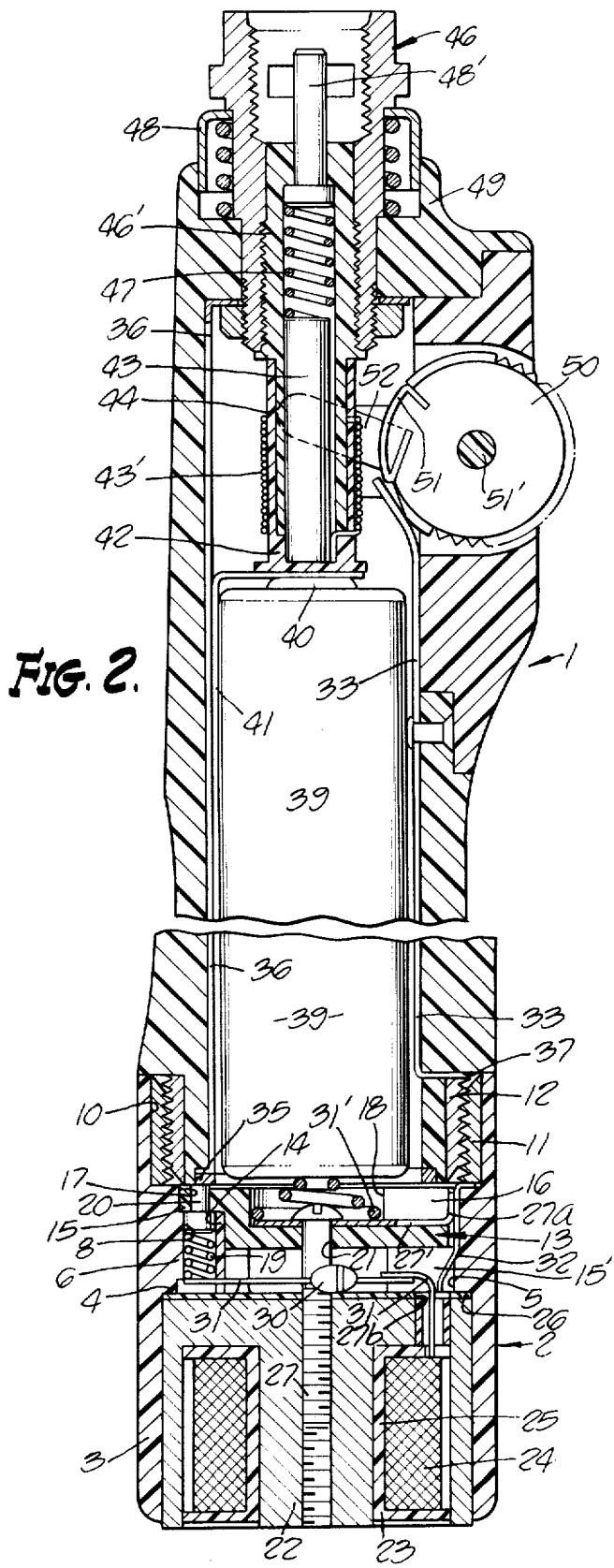
FIG. 2 is a section taken along lines 2—2 of FIG. 1.

In FIG. 2, the portable illuminating device is shown generally at 1 and is composed of a casing made of insulated material, such as synthetic plastic material, tubular in nature, which is connected as will be described below to the base section 2.

The insulating base section 2 carries a metallic E core 22 of suitable magnetic properties, terminates in an internal shoulder 4 formed by an off-center bore 5 leaving an off-center flange 6 which is bored with a bore 8. Positioned on the internal flange 6 is a fitting 13 (see FIG. 3) formed with a notch 14 providing an overhanging lip 15 and a dependent leg 15'. The insulated molded fitting 13 carries a central counterbore 18 and a vertical notch 16 and is bored with a bore 17 in the flange 15 and with a central bore 21. The end section 2 is counterbored at 10 to receive the screw-connected brass rings 12 and 11. The ring 11 is cemented to the interior of the counterbore 10, and the brass ring 12 is cemented to the end of the housing 1 as shown in FIG. 2.

A washer 27' (see FIG. 3) bearing a central bore and a lip 27a is fitted into the bore 18 of the fitting 13 with the 27a fitting into the notch 16. The fitting 13 is secured to the core 22 of the secondary winding 24 as will be described below by means of the screw 27. A coil spring 19 is fitted into the bore 8 and a plunger 20 is fitted into the bore 17 (FIG. 3) as will be described more fully below.

The core 22 carries an electromagnetic coil 24 positioned in a spool 25. The electrical conduits 31 and 32 to the coil pass through bore 27b and 28 in plate 26 (see FIG. 3). The terminal conduit 31 in which the rectifying diode 30 is positioned extends through a slot in the flange 6 to be positioned underneath the coil spring 19 to make electrical contact therewith. A helical coil 31' is positioned inside the bore 18. As will be seen, a closed circuit appears from the one terminal of the coil 24 through an AC rectifier such as a diode 30 and the conduit 31 to the coil 19 and from the coil 19 to the plunger 20 which is insulated in the non-metallic fixture 13. It will also be noted the plunger 20 is insulated from the brass ring 12 by the insulating fitting 13.

The conduit 32 which passes through the bore 28 in the insulating plate 26 is clamped between the housing 2 and the brass ring 11. The conductor strip 33 which is bent at right angles is fitted in a slot 37 provided in the handle and ring 12 to make electrical contact therewith. It extends upward through the interior of the tubular handle 1. A second electrical strip conductor 36 which ends in a bent section which is clamped between the handle 1 and the metallic ring 35 makes metallic contact with the piston 20. The strip conductor 33 is bent at an obtuse angle to make contact with the arcuate conductor 51 mounted upon the wheel 50 rotatably mounted on the shaft 51'. The wiper 52 is electrically connected to the arcuate contact 51 to be further described. The battery 39 whose exterior surface is insulated is positioned upon the coil spring 31' and spaced from the ring 35. The base of the battery which is one battery terminal makes electrical contact with the coil spring 31 which thus forms one terminal of the changing system. The coil is in electrical contact with the washer 27 and the washer at 27' is in electrical contact with the conductor 32 and rings 11 and 12. The right-angle bent conductor 41 is electrically connected to the strip conductor 36 and is fitted between the positive terminal 40 of the battery 39 and the insulating cap 42 in which the pin 43 is slidably positioned.

The power takeoff includes the lamp housing 46 and carries an insulating tubular section 46' in which the pin 43 is positioned and carries a coil spring 47 within the tubular portion and a plunger 48' in the coil spring housing 46'. The electrical connector 36 extends to and is clamped to the lamp housing 46 and makes electrical contact therewith.

The coil rheostat 43' is wound around an insulating tube 44 mounted on the exterior of the tubular fitting 46'. One end of the resistor of the rheostat is fitted throuogh a slot in the cap 42 to make electrical contact with the pin 43. The wiper 52 is moved by the wheel 50 to change the resistance in series with the electrical conduit 33 and the metallic pins 43 and 48'.

A lamp (not shown) positioned in the socket 46 will make electrical contact with the lamp socket and the pin 48' to be powered by the battery.

It will be seen that a circuit is completed from the negative of the battery 39 through the coil spring 31' positioned on the metallic washer 27'. Lip 27a contacts conductor 32 making electrical contact therethrough to the brass ring 12 which, in turn, is electrically connected to the conductor 33 and the rheostat and is connected to the metallic pin 43 positioned in the insulated housing 46'. The positive of the battery is connected through the conductor 41 and 36 and to the metallic lamp socket 46, thus completing the circuit.

With the lamp in position in the socket, the battery supplies power to the lamp; and the intensity of the light may be adjusted by adjusting the rheostat.

Figure 1:
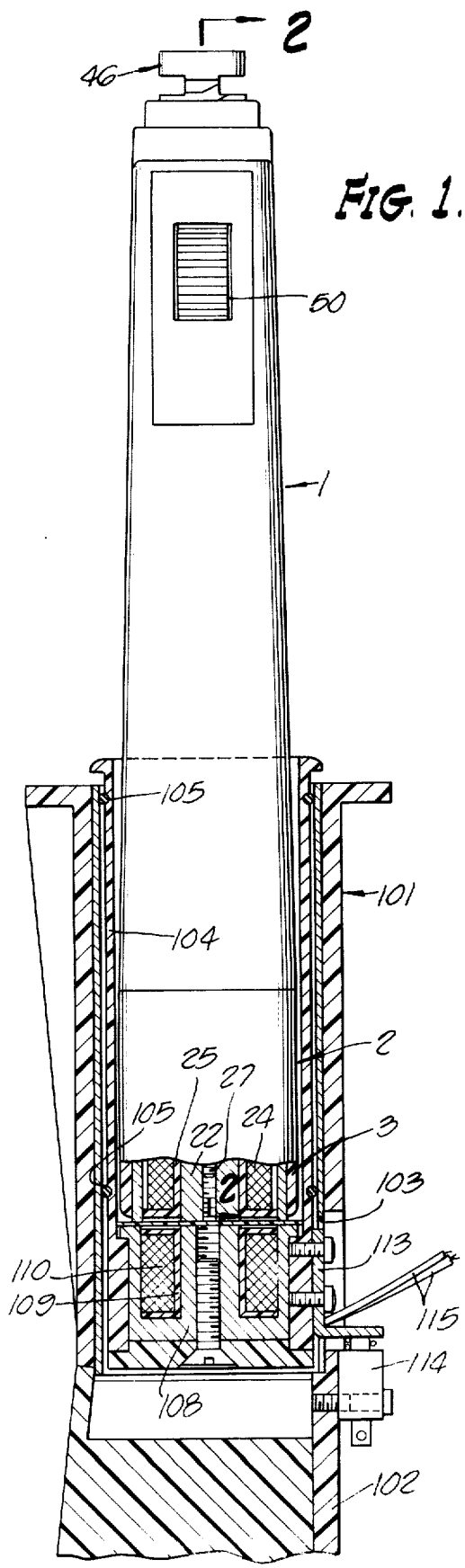

To recharge the battery 39, a recharging device is provided as shown in FIG. 1. A cooperating primary coil is provided as shown in FIG. 1. It consists of a tubular housing 101 mounted on a base 102. The tubular insulating housing 101 is supplied with a slot 103 for purposes to be described below. A tubular insulating receptacle 104 may be positioned inside the tubular housing 101 separated by insulating O rings 105. The housing 101 has positioned in the bottom thereof a primary electromagnetic coil bearing an E core 108 of suitable magnetic properties and an electromagnetic coil 110 mounted in spool 109. A bracket 113 is mounted on the housing 104 through the slot 103. The bracket contacts a spring-supported plunger switch 114 which on depression closes the circuit on the primary coil from a suitable AC source. Suitable electrical connectors 115 are provided. When the handle 1 is inserted in the tubular housing 104, designed to receive the housing 1, it is pushed down on the plunger to depress the spring, the circuit is closed by the switch 114. The induced electrical potential between the conduits 32 and 31 is thus imposed across the terminal of the battery 39 through the coil 31' and contact 41. Prior to charging, the wheel 50 is rotated so as to move the wiper 52 off the coil onto the tube 45 so as to open the circuit from the battery to the lamp socket.

Figure 7:
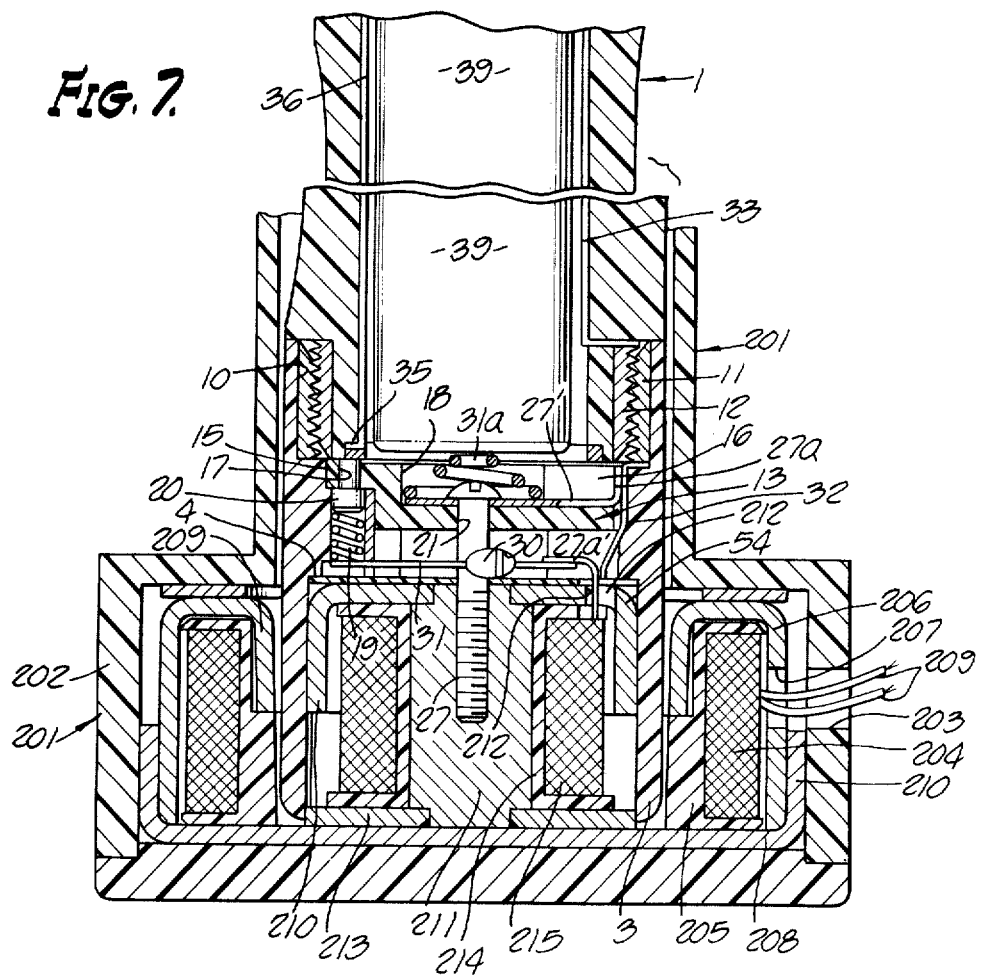
FIG. 7 shows a modification of the lower section of FIG. 2 and an alternative and preferred form of the recharging device as shown in FIG. 1.

FIG. 7 illustrates a preferred embodiment of the primary of the charging unit showing in fragmentary detail a preferred modified secondary of the illuminating device in position for charging. The charging fixture 201 is formed of insulating material with an enlarged container 202. The wall of 202 contains a port 203. The primary coil 204 is positioned in a spool 205, said primary coil and spool providing an air core centrally of said primary coil. A metallic annular cup-shaped member 206 of suitable magnetic properties fits onto the top and exterior of the coil 204 and is provided with a port 207. A second cup-shaped member 208 of suitable magnetic properties fits on the bottom of the coil 204 and makes contact with the depending wall of the cap 206. The terminals of the coil 209 pass through the ports 203 and 207.

The secondary of the charging unit positioned in the body of the handle in the end section 3 as shown in FIG. 2 is modified by replacing the E core with a cylindrical metallic member 211 of suitable magnetic properties. The spools 214 of the coils 215 carry the cup-shaped metallic member 210 of suitable magnetic properties, which fit over the end of the spool and the member 211. It carries a port 212 through which the conduits 31 and 32 pass. The spools also sit on disc 213 into which the coil 211 fits. The disc of suitable magnetic properties makes metallic contact into the bottom of the cup 208.

The screw 27 is screwed into the cylinder 211. In all other respects, the system is the same as described in connection with FIGS. 1–6.

It will be seen that when the illuminating unit is inserted in the air core of the primary, the magnetic fields of the primary and secondary are coupled.

To charge the battery, the unit 1, in the same state as described in connection with the charging operation of FIGS. 1–6 is inserted into the spool to be positioned centrally of the coil 204; and charging operation begins as soon as power is imposed on the terminals 209. By removing the unit 1, charging is discontinued and an air core is developed centrally of the coil 204.

I claim:

1. A rechargeable battery-operated device, comprising a tubular housing, a secondary electromagnetic coil including a metallic core, a first terminal and a second terminal connected to said coil, a coil spring positioned in said tubular housing adjacent to said secondary coil, an electrical connection between said spring and the first terminal, a first electrical conduit connected to said first terminal and to said spring and extending along the interior of said housing, a rectifier positioned adjacent to said secondary and connected to the said second terminal, a second electrical conduit connected to said rectifier and extending along the said housing, a third electrical conduit electrically connected to said second electrical conduit, a power takeoff comprising a first power takeoff terminal and a second power takeoff terminal, said takeoff including an insulating tubular member, a first plunger and a second plunger in said tubular member, a second coil spring in said tubular member positioned between said first and second plungers, said first plunger extending through one end of said insulating tubular member and the second plunger extending through the other end of said tubular member, an insulating cap mounted on the extending end of said second plunger, the first plunger constituting one terminal of a power takeoff, a coil rheostat mounted on the exterior of said last-named tubular member, one end of said rheostat coil extending through said last-named tubular member and electrically connected to said second plunger, a rheostat wheel rotatably mounted in said housing adjacent to said rheostat, an electrical contact on said wheel, said first conduit making electrical contact with said contact on said wheel, a rheostat wiper mounted on said wheel and making electrical contact with said contact on said wheel and said rheostat coil, said third electrical conduit electrically connected to said second electrical conduit and positioned adjacent to said cap, said second electrical conduit connected to a second power takeoff terminal.

2. In the device of claim 1, said power takeoff being a lamp socket, said second plunger centrally positioned in said socket, the said second conduit connected to the said socket.

3. In the device of claim 1, rechargeable battery positioned in said tubular housing, the base of the battery mounted on and making electrical contact with said coil spring, the other terminal of the battery positioned adjacent said cap and said other terminal making electrical contact with said third electrical conduit.

4. In the device of claim 3, said power takeoff being a lamp socket, said second plunger centrally positioned in said socket, the said second conduit connected to the said socket.

5. In combination with the device of claim 1, a tubular housing, a primary housing member, a primary electromagnetic coil mounted in the base of said primary housing member, said primary housing member being of size to receive the device of claim 1, with the secondary coil of said device mounted in inductive relation with said primary electrical coil.

6. In the device of claim 1, a tubular housing, a base for said housing, a primary housing member, a primary electromagnetic coil are mounted in the base of said housing, an air core for said coil, said primary housing member being of size to receive the device of claim 1, with the secondary coil of said device mounted in inductive relation with said primary.

7. In the device of claim 1, said primary housing member including a base member, the said primary coil wound on a spool to provide an air core, a cup-shaped metallic member, one end of said spool positioned on said cup-shaped member and an annular cup-shaped metallic member extending over the other end of said spool.

* * * * *